(12) United States Patent
Yu

(10) Patent No.: US 6,434,468 B1
(45) Date of Patent: Aug. 13, 2002

(54) SHIFT CONTROL METHOD FOR AUTOMATIC TRANSMISSION

(75) Inventor: Pyung-Hwan Yu, Suwon (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/611,848

(22) Filed: Jul. 7, 2000

(30) Foreign Application Priority Data

Dec. 10, 1999 (KR) .............................................. 99-56523

(51) Int. Cl.$^7$ ................................................ G06F 17/00
(52) U.S. Cl. ............................ 701/55; 701/51; 701/58; 701/62; 701/64; 180/170; 180/179
(58) Field of Search ................................ 701/1, 51, 55, 701/58, 64, 95, 93, 101, 110, 65, 94, 62; 477/120, 211, 902, 903; 180/170, 179, 197, 282

(56) References Cited

U.S. PATENT DOCUMENTS

| | | | | |
|---|---|---|---|---|
| 4,486,838 A | * | 12/1984 | Itoh et al. ..................... | 701/66 |
| 4,823,643 A | * | 4/1989 | Koshizawa ..................... | 74/866 |
| 5,058,014 A | * | 10/1991 | Saitou et al. .................. | 701/60 |
| 5,468,198 A | * | 11/1995 | Holbrook et al. ........... | 477/143 |
| 5,800,307 A | * | 9/1998 | Choi ............................. | 477/94 |
| 5,806,009 A | * | 9/1998 | Horiguchi ..................... | 701/58 |
| 6,070,118 A | * | 5/2000 | Ohta et al. ..................... | 701/65 |

* cited by examiner

Primary Examiner—Gertrude Arthur
(74) Attorney, Agent, or Firm—Christie, Parker & Hale, LLP

(57) ABSTRACT

A shift control method for an automatic transmission includes the steps of determining if upshift conditions are satisfied; determining if throttle valve opening is below a power on/off check line if upshift conditions are satisfied; determining, if throttle valve opening is below the power on/off check line, whether a change in throttle valve opening in a closed direction is less than a predetermined value; and preventing upshifting if the change in throttle valve opening in the closed direction is less than the predetermined value.

5 Claims, 5 Drawing Sheets

SHIFT CONTROL METHOD FOR AUTOMATIC TRANSMISSION

BACKGROUND OF THE INVENTION (a) Field of the Invention

The present invention relates to a shift control method for an automatic transmission, and more particularly, to a shift control method for an automatic transmission that prevents unnecessary shifting following the re-positioning of the accelerator pedal by the driver such that shift shock is reduced and acceleration performance improved.

(b) Description of the Related Art

Shifting is generally performed in an automatic transmission in accordance with changes in throttle valve opening. That is, throttle valve opening is varied through driver manipulation of the accelerator pedal, and such changes in throttle valve opening correspond to different locations on a shift pattern such that shifting is performed.

There are instances when the driver may depress and release (or release then again depress) the accelerator pedal during a short interval of time. With the use of the conventional shift control method, shifting is automatically performed as dictated by the shift pattern. For example, if the driver releases the accelerator pedal during upshifting, the upshift operation is completed then shifting is directly performed back into the lower speed. This greatly reduces shift feel as shock is generated with such frequent shifting over a short time interval. Also, responsiveness deteriorates in the case where, for example, the accelerator pedal is again depressed during a downshift operation.

SUMMARY OF THE INVENTION

The present invention has been made in an effort to solve the above problems.

It is an object of the present invention to provide a shift control method for an automatic transmission that prevents unnecessary shifting following the re-positioning of the accelerator pedal such that shift shock is reduced and acceleration performance improved.

To achieve the above object, the present invention provides a shift control method for an automatic transmission comprising the steps of determining if upshift conditions are satisfied; determining if throttle valve opening is below a power on/off check line if upshift conditions are satisfied; determining, if throttle valve opening is below the power on/off check line, whether a change in throttle valve opening in a closed direction is less than a predetermined value; and preventing upshifting if the change in throttle valve opening in the closed direction is less than the predetermined value.

According to a feature of the present invention, the method further comprises the steps of establishing a hold time for each shift range and determining if the hold time has elapsed if throttle valve opening is above the power on/off check line or the change in throttle valve opening in the closed direction is greater than the predetermined value; and performing upshift control if the hold time has elapsed and preventing upshifting if the hold time has not elapsed.

According to another feature of the present invention, in the step of performing upshift control if the hold time has elapsed, a control duty is determined by adding a compensation duty to a shift duty and upshift control is performed according to the control duty.

According to yet another feature of the present invention, in the step of performing upshift control if the hold time has elapsed, four different levels of compensation duties according to each shift range and throttle valve opening are determined.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will now be described in detail with reference to the accompanying drawings.

Figure 1:
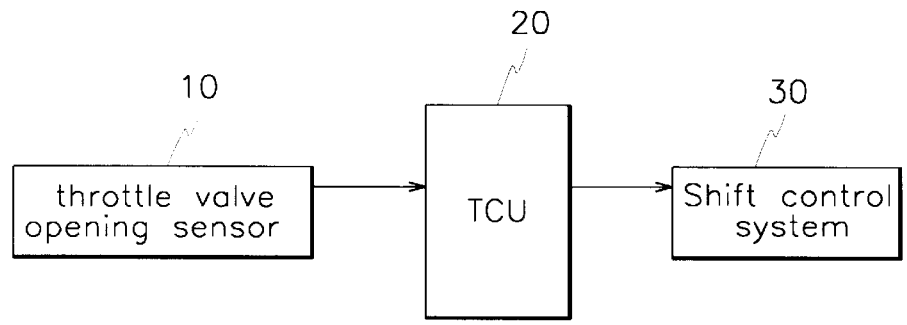
FIG. 1 is a block diagram of elements of an automatic transmission to which the present invention is applied.

FIG. 1 is a block diagram of elements of an automatic transmission to which the present invention is applied.

The elements include a throttle valve opening sensor 10 for detecting different opening degrees of a throttle valve and outputting corresponding signals; a transmission control unit (TCU) 20 for receiving the signals output by the throttle valve opening sensor 10 and preventing an upshift operation if throttle valve opening is below a power on/off check line and if a change in throttle valve opening is less than a predetermined value, the TCU 20 also outputting control signals; and a shift control system 30 for performing shifting of a transmission according to the control signals received from the TCU 20.

A shift control method according to a preferred embodiment of the present invention will now be described.

Figure 2:
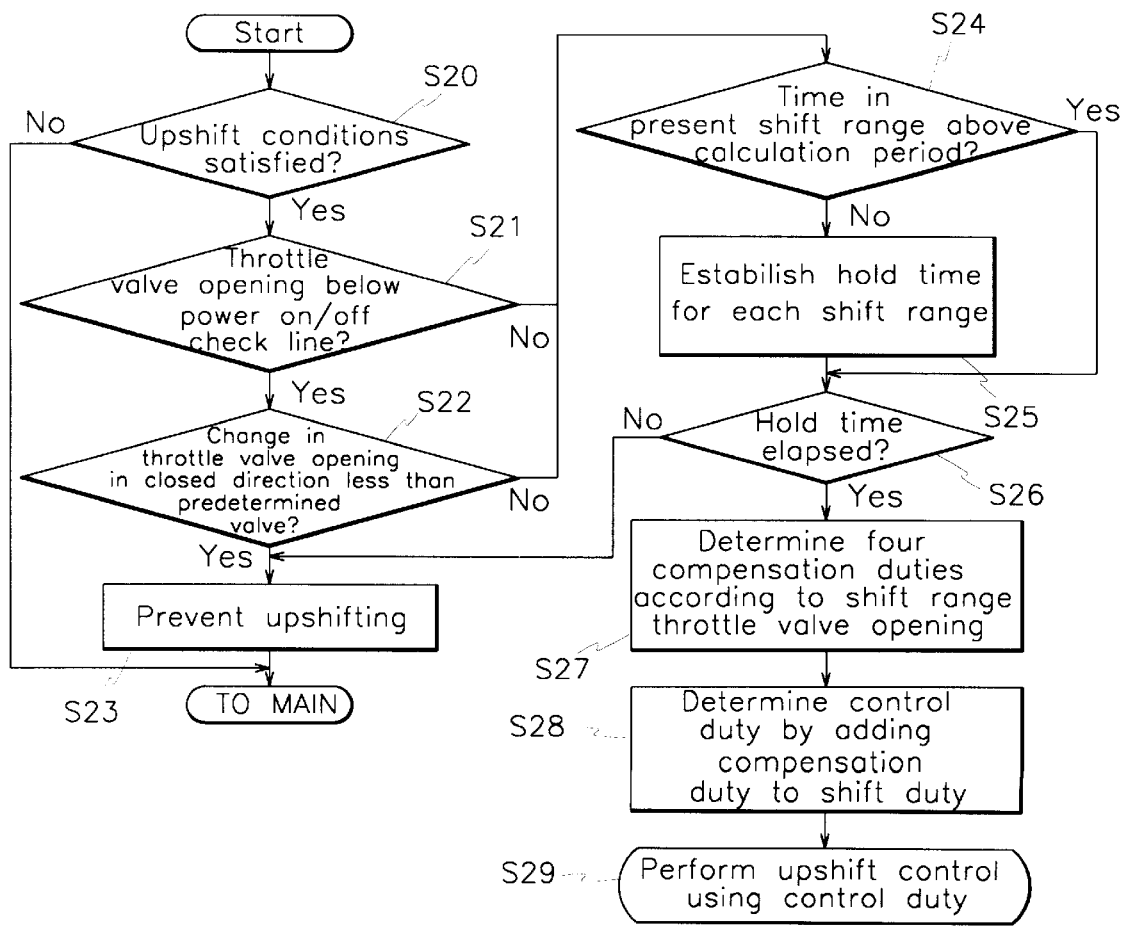
FIG. 2 is a flow chart of a shift control method according to a preferred embodiment of the present invention.

FIG. 2 shows a flow chart of a shift control method according to a preferred embodiment of the present invention;

First, it is determined by the TCU 20 whether upshift conditions are satisfied using the signals received from the throttle valve opening sensor 10 in step S20. If throttle valve opening is large enough for performing an upshift operation, the TCU 20 then determines if throttle valve opening is below a power on/off check line in step S21. However, if the conditions for performing upshifting are not satisfied in step S20, the TCU 20 directs the process to a main program.

Next, if throttle valve opening is below the power on/off check line in step S21, the TCU 20 determines if a change in throttle valve opening in a closed direction is less than a predetermined value in step S22. At this time, the predetermined value is varied according to rpm. If the change in throttle valve opening in the closed direction is less than the predetermined value, upshifting is prevented in step S23.

If throttle valve opening is above the power on/off check line in step S21 or the change in throttle valve opening in a closed direction is greater than the predetermined value in step S22, the TCU 20 determines if a time in the present shift range is above a calculation period in step S24. If the time in the present shift range is not above the calculation period, a hold time is established for each shift range in step S25, after which it is determined if the hold time has elapsed in step S26. However, if the time in the present shift range is above the calculation period in step S24, step S25 is skipped and step S26 is directly performed. In addition, if the hold time has not elapsed in step S26, the process is returned to step S23 of preventing upshifting.

After the hold time has elapsed, the TCU 20 determines four different levels of compensation duties according to each shift range and throttle valve opening in step S27. Next, a control duty is determined by adding one of the compensation duties to a shift duty in step S28, after which upshift control is performed using the control duty in step S29.

As described above, the shift control system 30 either performs shifting or prevents shifting according to the control signals output by the TCU 20. This will be described in more detail with reference to FIGS. 3–6.

Figure 3:
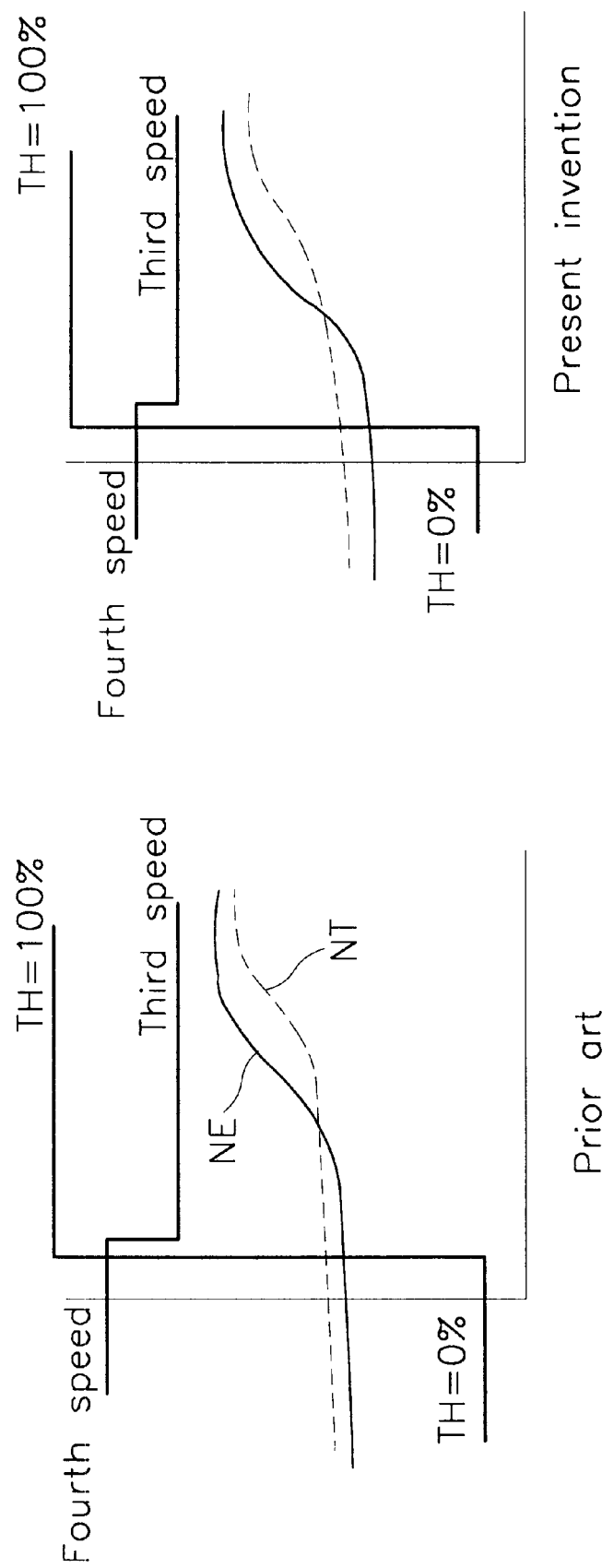
FIG. 3 shows graphs comparing throttle valve opening, turbine rpm, engine rpm and shift timing for the prior art and the present invention as throttle valve opening is increased from 0% to 100%.

FIG. 3 shows graphs comparing throttle valve opening, turbine rpm, engine rpm and shift timing for the prior art and the present invention as throttle valve opening is increased from 0% to 100%. As shown in the graphs, when throttle valve opening is abruptly increased to 100% from 0%, a forced downshift operation into the third speed from the fourth speed is performed with the use of both the prior art and present invention methods.

Figure 4:
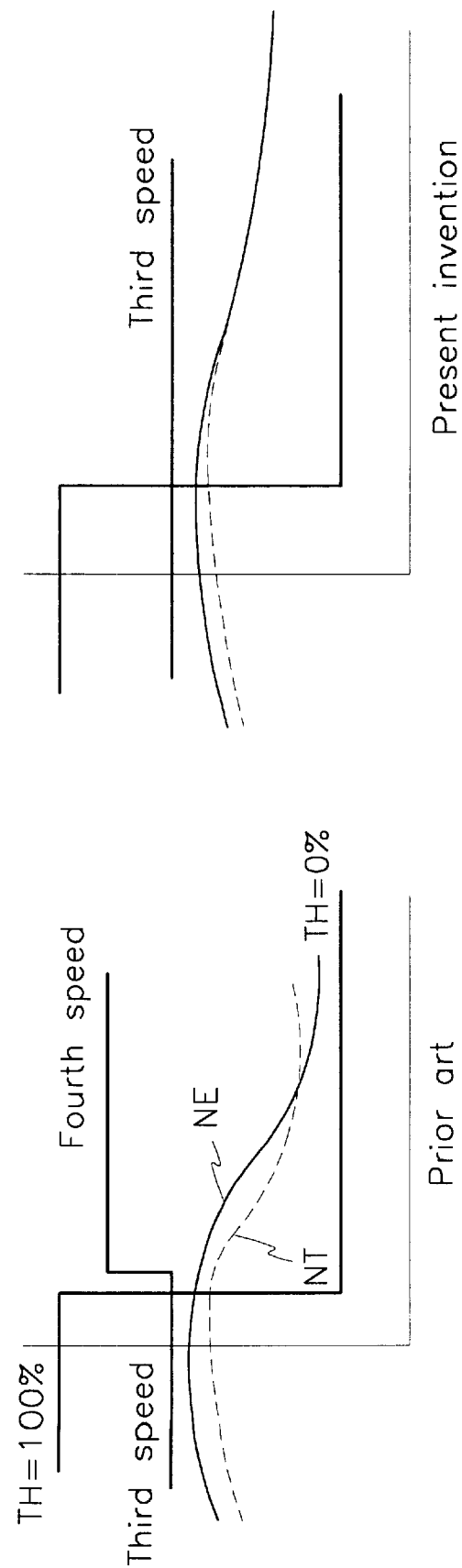
FIG. 4 shows graphs comparing throttle valve opening, turbine rpm, engine rpm and shift timing for the prior art and the present invention as throttle valve opening is decreased from 100% to 0%.

FIG. 4 shows graphs comparing throttle valve opening, turbine rpm, engine rpm and shift timing for the prior art and the present invention as throttle valve opening is decreased from 100% to 0%. In the case where throttle valve opening is abruptly decreased to 0% from 100%, shifting into the fourth speed is performed using the prior art method. However, with the use of the method of the present invention, the third speed is maintained.

Figure 5:
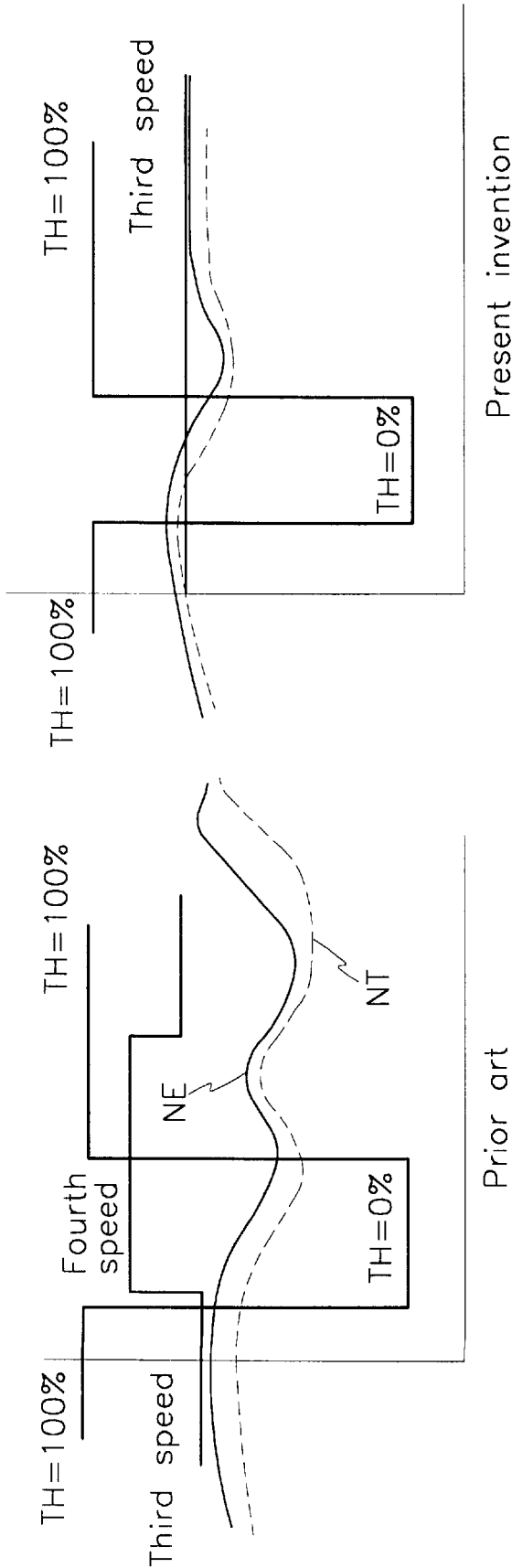
FIG. 5 shows graphs comparing throttle valve opening, turbine rpm, engine rpm and shift timing for the prior art and the present invention as throttle valve opening is decreased from 100% to 0% then again increased to 100%.

FIG. 5 shows graphs comparing throttle valve opening, turbine rpm, engine rpm and shift timing for the prior art and the present invention as throttle valve opening is decreased from 100% to 0% then again increased to 100%. In this case, shifting from the third speed to the fourth speed, then again into the third speed is performed with the use of the prior art method. In the method of the present invention, control is performed such that the third speed is maintained.

Figure 6:
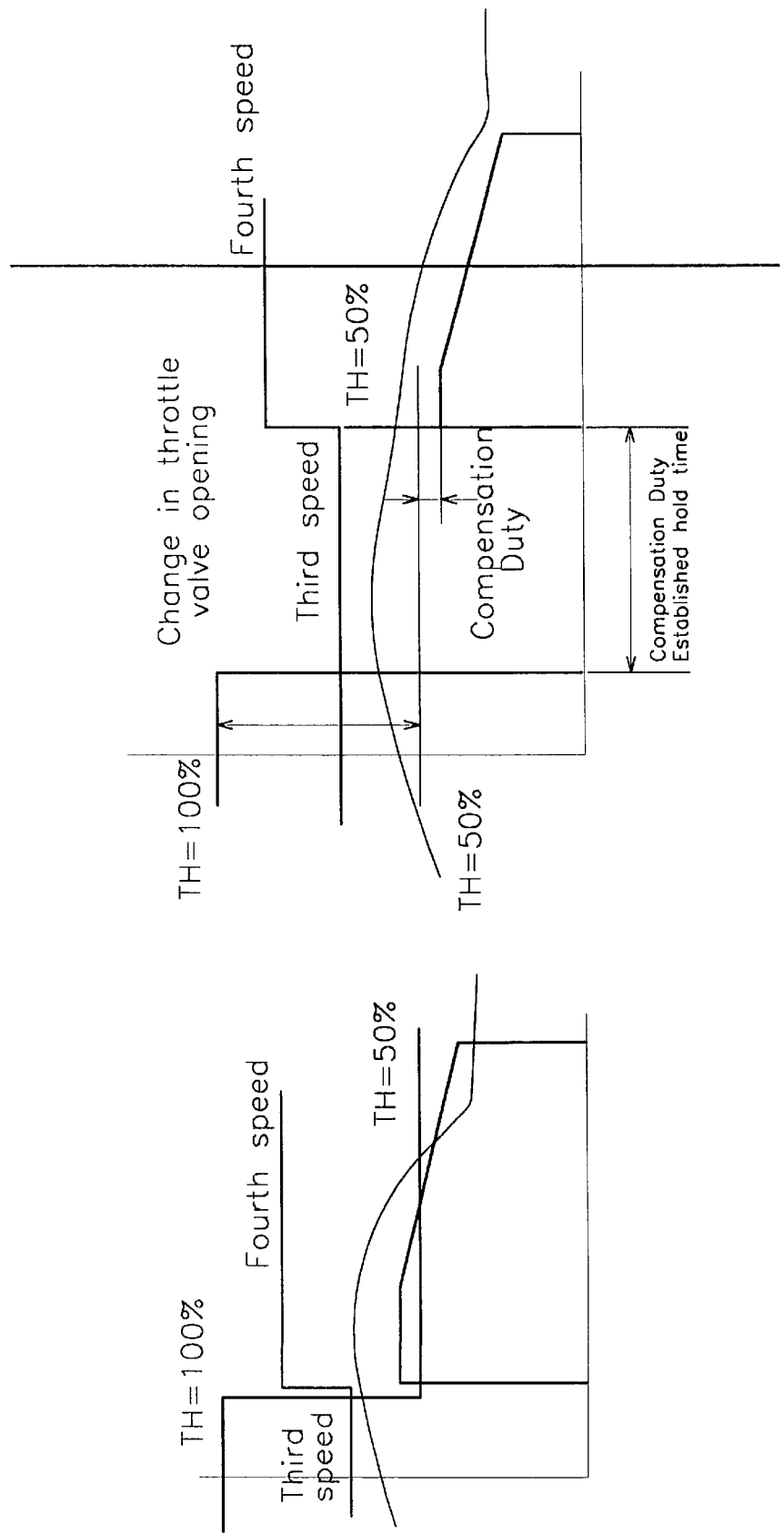
FIG. 6 shows graphs comparing throttle valve opening, turbine rpm, engine rpm and shift timing for the prior art and the present invention as throttle valve opening is decreased from 100% to 50%.

FIG. 6 shows graphs comparing throttle valve opening, turbine rpm, engine rpm and shift timing for the prior art and the present invention as throttle valve opening is decreased from 100% to 50%. With a decrease in throttle valve opening to 50% from 100%, shifting into the fourth speed is almost directly performed with the prior art method. On the other hand, shifting is prevented with the method of the present invention for the duration of the hold time, then after the hold time has elapsed, shifting into the fourth speed is performed.

In the shift control method for automatic transmissions of the present invention, unnecessary shifting following the re-positioning of the accelerator pedal is prevented such that shift shock is reduced and acceleration performance improved.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A shift control method for an automatic transmission comprising the steps of:

determining if upshift conditions are satisfied;

determining if throttle valve opening is below a power on/off check line if upshift conditions are satisfied;

determining, if throttle valve opening is below the power on/off check line, whether a change in throttle valve opening in a closed direction is less than a predetermined value; and preventing upshifting if the change in throttle valve opening in the closed direction is less than the predetermined value.

2. The method of claim 1 further comprising the steps of:

establishing a hold time for each shift range and determining if the hold time has elapsed if throttle valve opening is above the power on/off check line or the change in throttle valve opening in the closed direction is greater than the predetermined value; and performing upshift control if the hold time has elapsed and preventing upshifting if the hold time has not elapsed.

3. The method of claim 2 wherein in the step of performing upshift control if the hold time has elapsed, a control duty is determined by adding a compensation duty, responsive to a change in throttle valve opening, to a shift duty and upshift control is performed according to the control duty.

4. The method of claim 3 wherein in the step of performing upshift control if the hold time has elapsed, four different levels of compensation duties according to each shift range and throttle valve opening are determined.

5. The method of claim 2 wherein upshift conditions are satisfied when the throttle valve opening is large enough for performing a single upshift operation.

* * * * *